July 28, 1959     W. M. SHELDON     2,896,824
ROTARY TABLE FEEDER
Filed Aug. 28, 1956     2 Sheets-Sheet 1
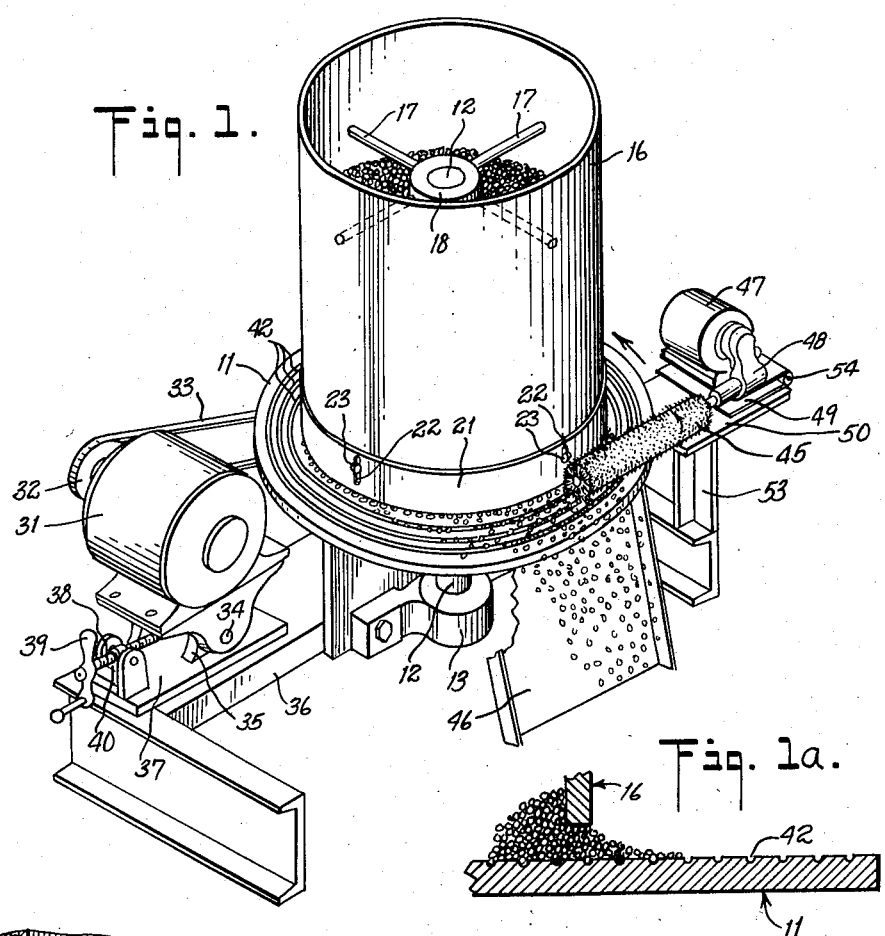
Fig. 1.
Fig. 1a.
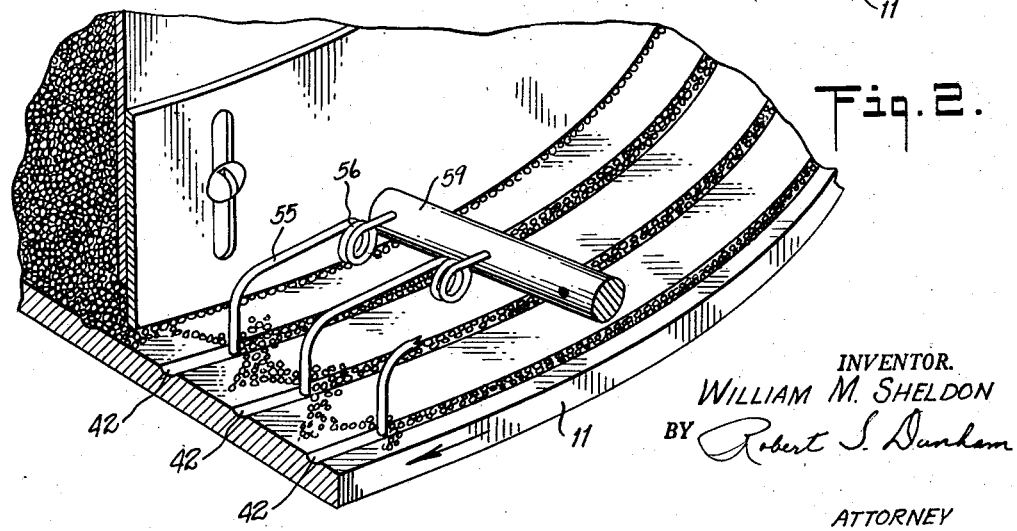
Fig. 2.
INVENTOR.
WILLIAM M. SHELDON
BY Robert S. Dunham
ATTORNEY July 28, 1959 W. M. SHELDON 2,896,824
ROTARY TABLE FEEDER
Filed Aug. 28, 1956 2 Sheets-Sheet 2

INVENTOR.
WILLIAM M. SHELDON
BY
ATTORNEY

# United States Patent Office 2,896,824
Patented July 28, 1959

2,896,824

ROTARY TABLE FEEDER

William M. Sheldon, Elizabeth, N.J., assignor to Metals Disintegrating Company, Inc., Union, N.J., a corporation of New Jersey Application August 28, 1956, Serial No. 606,755

8 Claims. (Cl. 222—168)

This invention is concerned with a rotary material-feeder. More specifically the invention relates to an improvement in a rotary feeder of a type having a table and bin which rotate together, and which includes means to deflect a desired quantity of material to be fed, off the edge of the table.

Heretofore, rotary feeders of the type mentioned above have been unable to handle granular or pelletized materials, or any material which has a low angle of repose. Although rotary feeders worked satisfactorily for certain types of materials where there was considerable cohesiveness with respect to a given quantity of the material, such a feeder could not be used where the material to be fed was of a type such that the individual particles had low cohesive qualities, or had a relatively low angle of repose. The reason for such failure to operate successfully with such materials, was because of the nature of the machine, i.e. there is an opening all the way around the periphery at the base of the hopper or bin. Consequently, when the machine was rotated, this type of material would tend to flow out across the table in an uncontrolled manner and be dispersed in all directions and no controlled feeding could be had.

By making use of the improved structure according to this invention, the above difficulties and failings of this type of machine may be fully overcome. Consequently, feeders of this type in accordance with this invention, may be employed for a whole new field of materials that were formally not possible to feed in this type of machine. Feeders of this type generally, are used for many feeding operations, or similar uses, where it is important to obtain a predetermined and constant rate of feed of the material. Thus by using a rotary feeder of this type the bin or hopper may be periodically filled, or kept full, while the machine continues to operate and feed out the material contained in the hopper at a closely controlled rate. Feed rates can be precisely regulated in machines of this type by regulating the speed of rotation, and also by regulating the position of a deflector which removes the material from the edge of the rotating table.

Throughout this specification where the terms "angle of repose" are employed, it is desired that the following definition thereof should apply. The angle which corresponding points on average sized particles of a given material, makes with the horizontal (or a given plane surface) where the material is free on the horizontal surface without any lateral restraint.

It is an object of this invention to provide an improved type of rotary feeder, particularly for handling granular or freely rolling particles and which can feed granular and free rolling particles at a controlled rate.

Another object of this invention is to provide a rotary feeder of a type wherein the material fed is supported on a table within a container, and where both table and container are rotated together. The improvements in such a machine including certain configurations on the surface of the table, so that material which ordinarily would freely roll off the edges of the rotary table in all directions, is retained and fed out in a controlled manner.

The invention comprises certain aspects of a rotary feeder of a type having a receptacle for material to be fed out, at a predetermined constant rate. Such rotary feeder including a rotatable table, and side walls rotatable simultaneously with the table and spaced therefrom. The rotary feeder also including means for deflecting a predetermined amount of said material from within the said receptacle, off of the edge of said table. The invention being concerned with an improvement for a rotary feeder including the above elements; which improvement includes means on the surface of said table for restraining the said material from flowing freely off the table and being broadcast at random where said material has a very low angle of repose.

The best known modes of carrying out the invention as now contemplated are described below, and illustrated in the drawings in which:

Fig. 1 is a perspective view of a complete feeder according to one embodiment of the invention;

Fig. 1a is a fragmentary enlarged detail view in vertical transverse section showing the relationship between the table, the walls of the feed bin and the particles to be fed;

Fig. 2 is a fragmentary enlarged detail showing, in perspective, illustrating a groove cleaning means;

Figure 3:
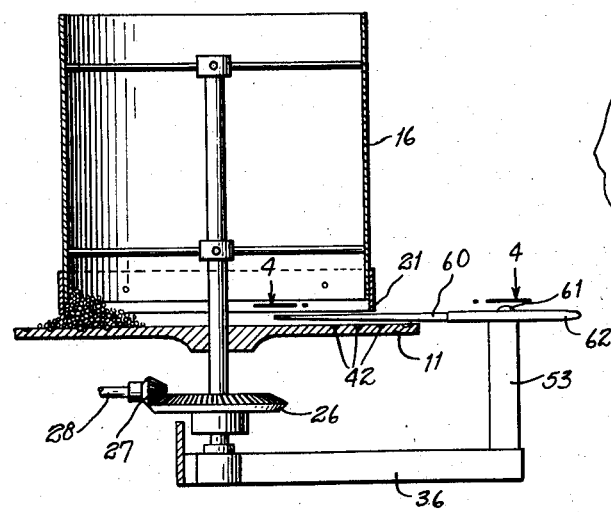
Fig. 3 is a longitudinal vertical view partly in cross section, illustrating a machine similar to that of Fig. 1, but which employs a blade deflector.

Referring to Fig. 1, the principal elements of the feeder include a horizontally disposed table 11 which is supported by and securely fastened to a vertical shaft 12. The shaft 12 is supported in its vertical position for free axial rotation, by a thrust bearing 13. Also supported by and firmly attached to the shaft 12, there is a cylindrical bin or hopper 16. The hopper or bin 16 is attached to the shaft 12 by a plurality of radially disposed rods or braces 17. These rods 17 may be attached to the side walls of bin 16 in any convenient manner, e.g. by riveting or welding. The rods 17 are fastened for lateral support from the shaft 12 by means of a collar 18 which fits snuggly over the shaft 12 and is fastened to the shaft 12 for positive rotation therewith in any convenient manner, e.g. by using a set screw or the like.

Near the bottom edge of the cylindrical side walls of bin 16, there is a band 21 that encircles the entire circumference of the bin 16 at the lower edge thereof. This band 21 provides for an adjustment of the clearance, or space, between the surface of the table 11 and the lower edge of the bin 16. Thus, the band 21 may be attached for vertical adjustment by any convenient arrangement, e.g. by employing vertical slots 22 in the band 21 and having machine screws 23 threadably attached to the walls of the bin 16 with the heads thereof projecting over the edges of the slots 22 in the band 21. Thus, by loosening the screws 23, band 21 may be slid vertically to vary the space between the lower edges of the band 21 and the surface of the table 11. The screws 23 will be tightened to maintain a given spacing when in use.

The shaft 12 is rotated at a desired speed by any convenient drive connection e.g. by having a bevelled gear, such as shown at 26 in Fig. 3, attached securely to the shaft 12 below the table 11, and a pinion 27 meshing with the gear 26 for changing the direction of shaft axis at right angles. The pinion 27 is carried by, and is securely attached to a shaft 28, for rotation therewith. The shaft 28 is driven in rotation from any convenient source of power, e.g. by having a belt drive connection with an electric motor 31 (as shown in Fig. 1), which carries a pulley 32 on the shaft thereof. Belt 33 is used to produce rotation of another pulley 29 (as shown in Fig. 3), which is conveniently located on the shaft 28.

The supporting structure illustrated in Figs. 1 and 3 includes a framework 36 that supports a plate 37 which carries the motor 31 in an adjustable manner. Thus, in order to adjust the tension on the belt 33 an arrangement has been employed wherein the motor 31 is pivotally supported from the plate 37 by means of a pair of lugs 35 on the plate 37 and stud shafts 34. The adjustment is carried out by changing the position of motor 31 about its pivots (studs 34) by means of a threaded shaft 38 which is pivotally supported by an internally threaded hole through a block 40 that is carried on the plate 37. The shaft 38 has a hand wheel 39 at the extremity thereof for effectuating the desired adjustment.

On the surface of the table 11 there is a plurality of grooves 42. These grooves are spaced fairly close together. The particular spacing being determined by the material that is to be handled in the feeder. These grooves are spaced radially from inside the side walls of the bin 16, to the periphery of the table 11. The function of these grooves 42, as best shown in Fig. 1a, is to catch and hold particles of the material being fed through the space between the lower end of the bin 16 and the surface of the table 11 against radial displacement which would be caused by the natural flow of the material being fed and to a lesser extent by the centrifugal force when the table 11 and bin 16 are being rotated. In this manner, even though the particles of the material are hard and nodular or spherical in shape, they will be restrained from rolling freely across the surface of table 11 and consequently, no general broadcasting of the particles of material will occur.

A preferable arrangement for deflecting the material at a particular feed out point around the edge of the table 11 is that illustrated in Fig. 1 which includes a rotating cylindrical brush 45. Brush 45 may be caused to rotate in a direction generally opposite to the rotation of the table 11, so that the action with the bristles of the brush 45, tends to dislodge and sweep off all of the particles of material which are carried into the path of the brush (as the brush lies in contact with the surface of the table 11) during each revolution of the table 11. As the particles of material are deflected from their circular travel and swept off the edge of the table 11 by the brush, they may be directed to a particular location, for use as desired, by means of any convenient structure such as a chute 46. In order to provide for a more efficient action of the brush 45, it is biased into contact with the surface of the table 11 in any feasible manner. One convenient arrangement is that illustrated, wherein the brush 45 is driven in rotation by means of an electric motor 47. There is a change direction gear housing 48 which provides a shaft rotation output at right angles to the shaft of the motor 47. Motor 47, along with its change direction gear housing 48, are mounted on a base 49 which in turn is mounted on the surface of a plate 50. The plate 50 is welded, or otherwise firmly attached, to an upright support angle 53. Thus, the aforementioned biasing for brush 45 is carried out by the weight of the motor 47, plus brush 45, by reason of the manner in which the motor is mounted, which includes a hinge 54. Hinge 54 has one part thereof fastened to the plate 50, while the other part is attached to base 49 of the motor 47. These mountings for motor 47 and plate 50 are set, so that there is clearance between the base 49 of motor 47 and the surface of plate 50 when the brush 45 is in contact with the surface of the table 11. Consequently, the brush 45 is being pressed downward toward the surface of the table 11 by the combined weight of the motor 47 and the brush 45 attached thereto, acting about the pivot of hinge 54.

Satisfactory results have been obtained with a feeder, according to this invention, with a rotating bin 18 inches high and 15 inches in diameter and with a rotating table 21 inches in diameter. Using rotational speeds of from ⅕ r.p.m. to 14 r.p.m. and higher. A cylindrical wire brush 1½ inches in diameter and 4 inches long has been used; the axis of the brush being disposed at a 45° angle to a radius of the table and bin. With the brush rotating at about 86 r.p.m. and the table and bin at ⅕ r.p.m., 1½ lbs. of copper shot was fed per minute. By adjustment of the table and bin rotation, the rate of feed was readily raised to 15 lbs. per minute. With the use of the brush, other types of metallic shot and nodules are effectively fed at controlled rates and the brush feeder has also been effective for various crushed granules such as carborundum, sand and quartz which cannot be effectively handled with ordinary scraper blades.

Effective retention of materials having a low angle of repose has been achieved with concentric grooves 1/32 of an inch deep and 1/16 of an inch wide with the grooves spaced about ¼ of an inch apart. Other groove sizes are also useful and the size and spacing may be varied to obtain the most desirable results, with the materials being handled. Spiral grooves, as well as concentric grooves, may all be used, and the grooves may be curved or V-shaped in profile or slightly raised ridges may also be found useful in achieving the purpose of providing means for retaining particles which would tend to flow out irregularly across the feed table at an uncontrolled rate. With the grooves, the material feeds out from the bin onto the table to substantially the same position around the table and stands at substantially the same angle of repose, particularly if the particles of the feed material are relatively the same in size and shape, so that the rate of feed can be accurately controlled and can be kept at an established rate.

Referring to Fig. 2, it will be observed, that there may be employed a means for cleaning the grooves 42 by dislodging any particles of the material being handled that are contained therein, as the table 11 is rotated. Such groove cleaning means might take various forms. The type illustrated includes a finger-like wire 55 located over each of the grooves 42. Each wire 55 has the extremity or tip thereof spring biased into contact with the surface of the groove 42, by means of an integrally formed coil spring section 56. The wire 55 is supported firmly by being attached to a rod 59 that extends in a radial direction over the surface of the table 11. The wires 55 may be attached to the rod 59 in any convenient manner, e.g. by being press fitted into holes in the rod 59 as illustrated in Fig. 2. Rod 59 is supported in any convenient manner (not shown) from the framework 36 for the entire machine, so that it is held in a given constant position over the edge of the table 11 to allow rotation of the table 11 to provide the relative motion for scraping the grooves 42 with the wires 55 as the table 11 is rotated. The particular location of groove cleaning means 55 may vary, depending upon the material employed, as well as the type of action which is desired. That is, it may be found more advantageous to locate the groove cleaning wires 55 behind the deflecting brush 45, so as to remove any particles which have become lodged in the grooves and were not removed by the action of the deflecting brush 45. However, in some instances, it may be found more advantageous to locate rod 59 so that the wires 55 are situated in front of the brush 45 in order to loosen the particles from the grooves 42 just prior to their being deflected and swept off the edge of the table 11.

In Fig. 3 there is illustrated a machine similar to that of Fig. 1 with the exception of the deflection brush 45 and its related elements. Consequently, the same reference numbers are employed for the same elements of the machine, but there is a deflector blade 60 used instead of a brush. Blade 60 is pivotally attached to the top of the support angle 53 in any convenient manner, e.g. by having a machine screw 61 pass through a hole in the blade 60 and threadably engage a tapped hole in the top of the support 53. The blade 60 has a handle 62 for setting the position of the blade to determine how much of the material will be deflected by the blade during each revolution of table 11 and bin 16.

It will be noted that the thickness of the blade 60 is such as to just fit underneath the lower edge of the band 21 around the bottom of the side walls of bin 16. However, it will be observed, by referring to Fig. 5, that an improved feature of the blade 60 lies in the fact that its leading edge 65 is thicker than its trailing edge 66. Thus, whatever material gets underneath the edge of the blade 60, does not become wedged or build up any jamming action which would tend to lift the blade away from the surface 11. In this manner even though the material is one where there is a tendency for individual particles to become broken or powdered, no harmful packing or jamming of such material will take place underneath the deflector blade 60.

Figure 4:
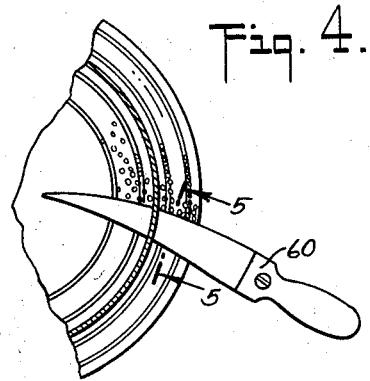
Fig. 4 is a fragmentary plan view, partly in cross section, taken along the line 4—4 of Fig. 3.
Figure 5:
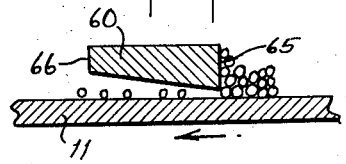
Fig. 5 is a transverse cross sectional view of the deflector blade taken along the lines 5—5 of Fig. 4.

With apparatus equipped as shown in Figs. 3, 4 and 5 accurately controlled feeding of cement dust has been achieved at rates varying from 32 grams per minute up to 25 lbs. per minute.

Figure 6:
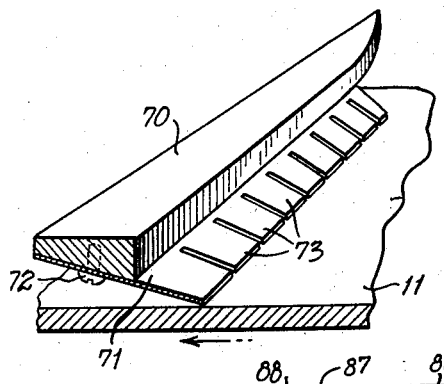
Fig. 6 is a fragmentary perspective view partly in cross section illustrating a modified form of the deflector blade; and, Fig. 7 is an elevation, showing a different modification of a rotary feeder for handling large quantities of material.

In Fig. 6 there is illustrated another embodiment of an improved deflector blade structure which includes a deflector blade 70 that has a plate 71 of flexible material attached thereto in such a manner as to extend out beyond the leading edge of blade 70. The plate 71 is set at an angle downward toward the surface of table 11, so that in use, the plate 71 rests in contact with the surface of the table 11. One satisfactory manner of attaching the plate 71 to the blade 70 is to employ a plurality of screws 72 for securely holding the plate 71 to the lower surface of the blade 70. The portion of the plate 71 which extends outward in front of the blade 70, is cut or slotted to form a plurality of teeth 73. In this manner, should any given scraper tooth 73 of the blade 70 become jammed, by reason of a hard particle wedging underneath the edge of the plate 71; such tooth may lift individually to release the pressure of such wedging action, without affecting the rest of the scraper teeth 73. Thus, a local jamming action will not disturb the amount of material being deflected to any appreciable extent, and the rate of feed of the machine will be maintained substantially constant.

Figure 7:
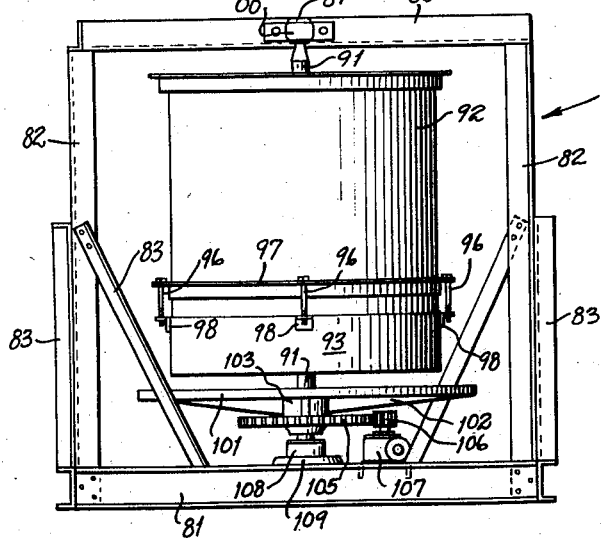

In Fig. 7 there is illustrated an embodiment of a rotary feeder according to this invention, that is designed for feeding relatively large quantities of material and which also may handle large sized particles. The basic elements of the machine are the same as those described above in connection with the Figs. 1 and 3 embodiments. However, in this instance there is a framework 80 which includes a square or rectangular base 81, having at diagonally opposite corners thereof, a pair of upright support members 82. Support members 82 are held firmly in position by diagonal braces 83, and across the top of the support members 82 there is a cross channel member 86. Fastened to the cross channel 86, for lateral support of the rotating elements of the machine, there is a bearing 87 that is held in place by a strap 88. Bearing 87 rotatably supports at the top thereof, a shaft 91 which carries attached thereto a cylindrical side walled bin or hopper 92. Near the lower edge of hopper 92 there is supported for vertical adjustment, a skirt 93. In this size machine, the vertical adjustment support for skirt 93 must be relatively rugged and strong. The arrangement includes a plurality of bolts 96 which pass through a flange or rim 97 around the periphery of the side walls of hopper 92. The bottom threaded portion of bolts 96 may be threadably received by lugs 98 that are conveniently attached to the skirt 93, as for example by being welded thereto. The relative size of the apparatus will be appreciated from the fact that the table 101 may be over 7 feet in diameter with the bin 92 about 8 feet tall and having a capacity of about 300 cubic feet.

At the lower end of the main supporting shaft 91 there is securely attached, for rotation therewith, a table 101. Table 101 has tapered braces 102 extending radially outward from a central hub 103 through which the shaft 91 passes. The rotational drive for shaft 91 and table 101, as well as hopper 92 therewith, is connected in any feasible manner, for example by employing a gear 105 at the lower end of the shaft 91, which has a pinion 106 meshing therewith. The pinion 106 is connected to a source of rotational power (not shown) by any convenient mechanical coupling arrangement, such as the change direction gearing 107 illustrated. At the lower extremity of shaft 91 there is a thrust bearing 108 for carrying the weight load of the table 101, shaft 91 and hopper 92; while providing the free axial rotation of the shaft 91. The thrust bearing 108 is firmly supported on the framework 80 by any convenient structure such as a base 109 that is attached to the base supports 81 of the framework 80.

While particular embodiments of the best modes of carrying out the invention now contemplated, have been described above in some detail, this is not to be taken in any way limiting the invention, but merely as being descriptive thereof.

It is claimed:

1. In a rotary feeder having a receptacle for material to be fed out at a predetermined constant rate including a rotatable table, side walls rotatable simultaneously therewith and spaced therefrom, and means for deflecting a predetermined amount of said material from within said receptacle off the edge of said table, the improvement comprising spaced groove means on the surface of said table for restraining said material from being broadcast at random where said material has a low angle of repose.

2. In a rotary feeder having a receptacle for material to be fed out at a predetermined constant rate including a rotatable table, side walls rotatable simultaneously therewith and spaced therefrom, and means for deflecting a predetermined amount of said material from within said receptacle off the edge of said table, the improvement comprising groove means on the surface of said table for restraining said material from being broadcast at random where said material has a low angle of repose, said deflecting means including brush means cooperating with said groove means for dislodging said material from said groove means.

3. In a rotary feeder having a receptacle for material to be fed out at a predetermined constant rate including a rotatable table, side walls rotatable simultaneously therewith and spaced therefrom, and means for deflecting a predetermined amount of said material from within said receptacle off the edge of said table, the improvement comprising concentric grooves on the surface of said table and cooperating with the said side walls to restrain said material from flowing off the table where said material has a very low angle of repose.

4. In a rotary feeder having a receptacle for material to be fed out at a predetermined constant rate including a rotatable table, side walls rotatable simultaneously therewith and spaced therefrom and means for deflecting a predetermined amount of said material from within said receptacle off the edge of said table, the improvement comprising concentric grooves on the surface of said table and cooperating with the said side walls to restrain said material from being broadcast at random where said material has a very low angle of repose, said deflecting means including counter rotating brush means cooperating with said grooves for dislodging said material from said grooves.

5. In a rotary feeder having a receptacle for material to be fed out at a predetermined constant rate including a rotatable table, side walls rotatable simultaneously therewith and spaced therefrom, and means for deflecting a predetermined amount of said material from within said receptacle off the edge of said table, the improvement comprising concentric grooves on the surface of said table and cooperating with the said side walls of restrain said material from being broadcast at random where said material has a very low angle of repose, said deflecting means including counter rotating brush means cooperating with said grooves for dislodging said material from said grooves, means for biasing said brush means into contact with the surface of said table, means located over the edge of said table and adjacent to said restraining means for dislodging any material that becomes stuck in said restraining means.

6. In a rotary feeder having a receptacle for material to be fed out at a predetermined constant rate including a rotatable table, side walls rotatable simultaneously therewith and spaced therefrom, and means for deflecting a predetermined amount of said material from within said receptacle off the edge of said table, the improvement comprising means on the surface of said table for restraining said material from being broadcast at random where said material has a very low angle of repose, said deflecting means including a curved blade located over the surface of said table and beneath said side walls for deflecting a predetermined quantity of material per revolution, means located over the edge of said table and adjacent to said restraining means for dislodging any material that becomes stuck in said restraining means, said curved blade having greater clearance from the surface of said table at the trailing edge than at the leading edge thereof to prevent any build-up of caked material under the blade.

7. In a rotary feeder having a receptacle for material to be fed out at a predetermined constant rate including a rotatable table, side walls rotatable simultaneously therewith and spaced therefrom, and means for deflecting a predetermined amount of said material from within said receptacle off the edge of said table, the improvement comprising means on the surface of said table for restraining said material from being broadcast at random where said material has a very low angle of repose, said deflecting means including a blade located over the surface of said table and beneath said side walls for deflecting a predetermined quantity of said material per revolution, said blade having greater clearance from the surface of said table at the trailing edge thereof than at the leading edge in order to prevent any build-up of material under the blade.

8. In a rotary feeder having a receptacle for material to be fed out at a predetermined constant rate including a rotatable table, side walls rotatable simultaneously therewith and spaced therefrom, and means for deflecting a predetermined amount of said material from within said receptacle off the edge of said table, the improvement comprising means on the surface of said table for restraining said material from being broadcast at random where said material has a very low angle of repose, said deflecting means including a blade located over the surface of said table and beneath said side walls for deflecting a predetermined quantity of said material per revolution, said blade having a flexible leading edge contacting the surface of the table, said leading edge being divided into sections to avoid lifting the entire blade should any material jam under the leading edge.

References Cited in the file of this patent

UNITED STATES PATENTS

| | | |
|---|---|---|
| 307,457 | Graze | Nov. 4, 1884 |
| 816,775 | Brauer | Apr. 3, 1906 |
| 818,585 | Trump | Apr. 24, 1906 |
| 911,816 | Gielow | Feb. 9, 1909 |
| 1,478,405 | Smith | Dec. 25, 1923 |
| 2,065,319 | Lewis | Dec. 22, 1936 |
| 2,102,948 | Francis | Dec. 21, 1937 |
| 2,775,371 | Isserlis | Dec. 25, 1956 |